INVENTOR
MURRAY IRELAND
BY H. M. Biebel
ATTORNEY

July 7, 1942.  M. IRELAND  2,288,713
AUTOMATIC TOASTER
Filed Nov. 30, 1940  5 Sheets-Sheet 3

INVENTOR
MURRAY IRELAND
BY H. M. Biebel
ATTORNEY

July 7, 1942.  M. IRELAND  2,288,713
AUTOMATIC TOASTER
Filed Nov. 30, 1940   5 Sheets-Sheet 4

INVENTOR
MURRAY IRELAND
BY H. M. Biebel
ATTORNEY

July 7, 1942.  M. IRELAND  2,288,713

AUTOMATIC TOASTER

Filed Nov. 30, 1940   5 Sheets-Sheet 5

INVENTOR
MURRAY IRELAND
BY H. M. Biebel
ATTORNEY

Patented July 7, 1942

2,288,713

UNITED STATES PATENT OFFICE 2,288,713

AUTOMATIC TOASTER

Murray Ireland, Elgin, Ill., assignor to McGraw Electric Company, Elgin, Ill., a corporation of Delaware Application November 30, 1940, Serial No. 367,894

14 Claims. (Cl. 219—19)

My invention relates to electric cooking devices and particularly to automatic electric toasters.

An object of my invention is to provide a relatively simple means actuable by the placing of a slice of bread on a vertically movable bread carrier for initiating the toasting operation of an intermittently operable automatic electric toaster.

Another object of my invention is to provide a normally deenergized electromagnetic means, the energization of which is effected by the placing of a slice of bread on a bread carrier to cause downward movement of the bread carrier and attendant closure of a switch controlling the toast heating elements.

Other objects of my invention will either be apparent from a description of one form of device embodying my invention or will be hereinafter pointed out, particularly in the appended claims.

Figures 1, 2:
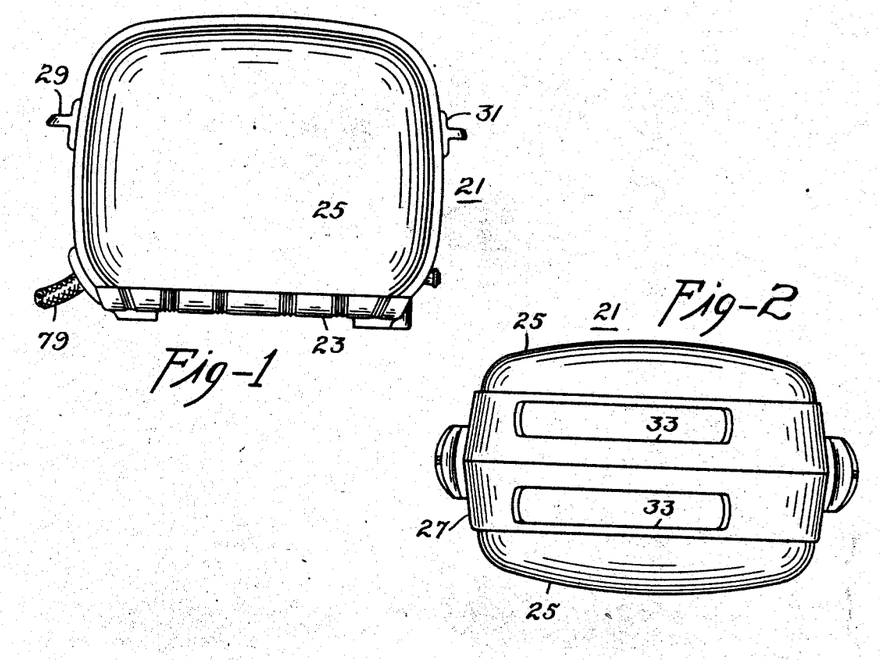
Figure 1 is a view in side elevation of a toaster embodying my invention, shown on a reduced scale.
Fig. 2 is a top plan view of the toaster shown in Fig. 1.

An automatic electric toaster embodying my invention is shown in Figs. 1 and 2 by the numeral 21 and includes a skeleton bottom frame 23 which may be made of moulded composition material and includes further an outer casing having side walls 25 and a top wall or cover member 27 both made of sheet metal and properly interfitting with each other and with the bottom frame 23 to provide an oven-type toaster. I may provide a rear carrying handle 29 and a front carrying handle 31 secured to cover or casing portion 27. The casing portion 27 is further provided with a pair of bread-receiving and bread-removing openings or apertures 33, and it will be noted that I have elected to show my invention as applied to a two-slice toaster although it is not limited to this specific number of slices of bread toastable at the same time.

Figure 3:
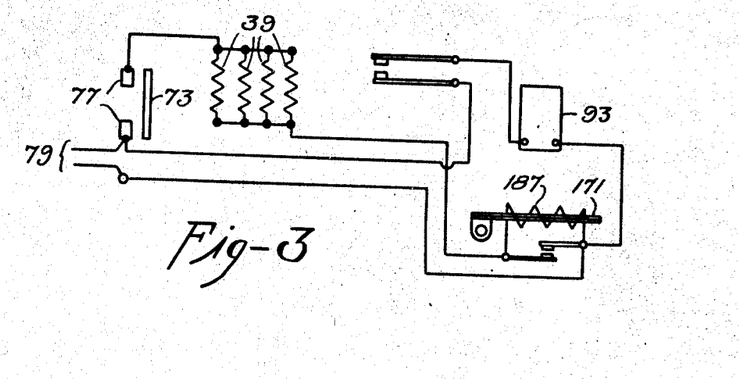
Fig. 3 is a diagram of the electrical connections of my improved toaster.

I provide a bottom metal plate 37 which may be suitably secured in any desired manner to the upper surface of the frame 23 and which is adapted to have mounted thereon a plurality of planar vertically extending heating elements 39 and I prefer to provide a pair of such spaced planar electric heating elements for each of the slices of bread to be toasted simultaneously in a toaster. I have, therefore, illustrated more particularly in Figs. 3 and 10 of the drawings, four such spaced heating elements. Each of these vertically extending heating elements includes one or more pieces or plates 41 of thin electric insulating material, such as mica, having mounted thereon a resistor conductor 43, all in a manner now well known in the art. The two outermost planar heating elements 39 constitute two side walls of a toasting chamber or of a plurality of toasting chambers which are further defined by a rear intermediate wall 45 and a front intermediate wall 47, all of these being of a construction and mounting now well known in the art. I provide further a plurality of guard or bread guide wires 49 which may be supported at their upper ends by the upper end of the respective heating elements or by any other suitable means which may include top frame plates 51 extending longitudinally of the toaster and having their front and rear end portions overlapping with and secured to the respective front and rear intermediate walls 47 and 45.

Figure 4:
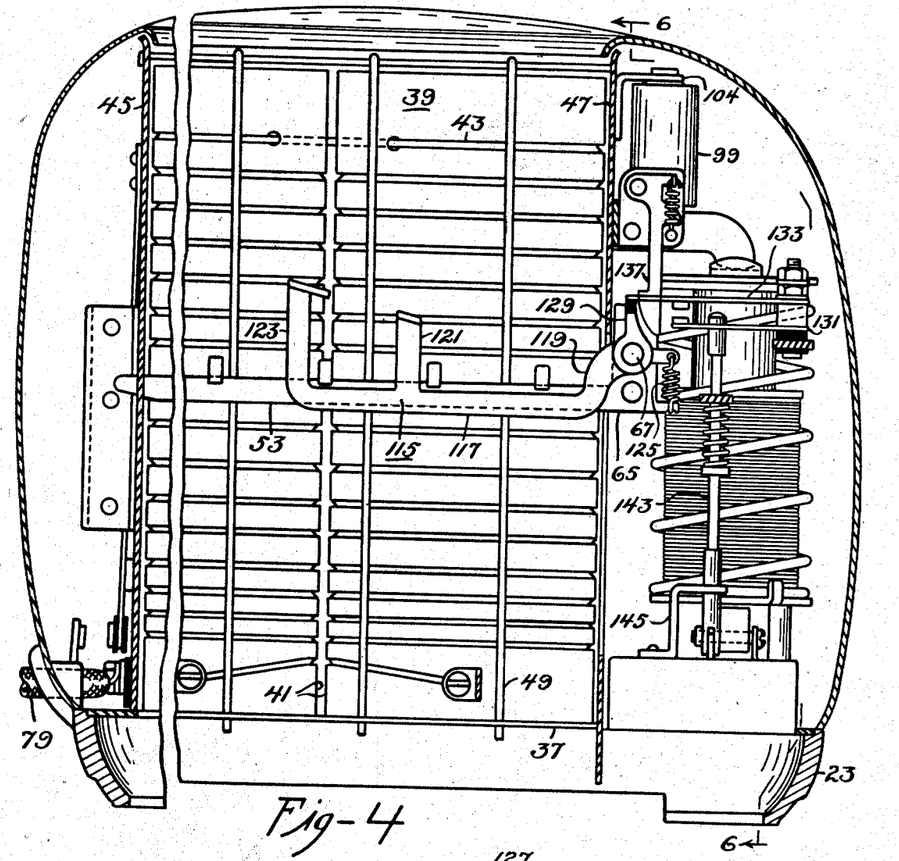
Fig. 4 is a vertical longitudinal sectional view through the casing and the toaster structure, taken on the line 4—4 of Fig. 6 showing the parts in non-toasting position without a bread slice in the toasting chamber.
Figure 9:
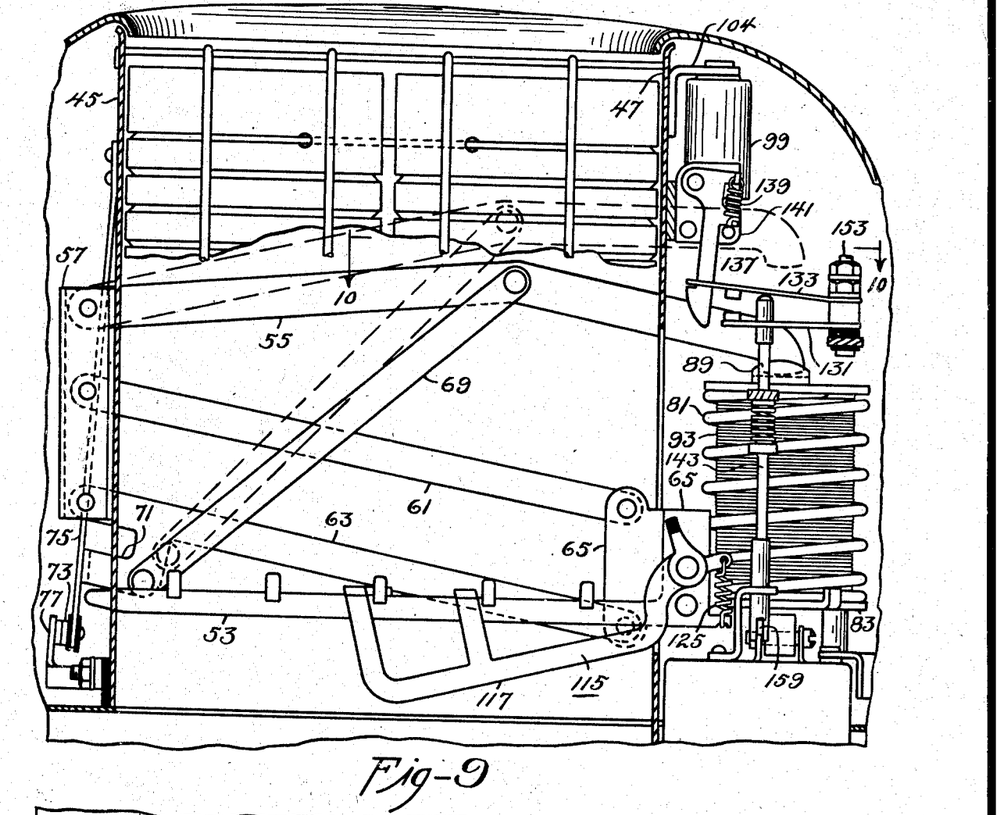
Fig. 9 is a vertical longitudinal sectional view similar to Fig. 4 except that the parts are shown in toasting position and that one set of heating coils have been broken away to show the lever system for moving the bread carriers.

I provide one or more bread carriers 53 normally yieldingly biased into their upper or non-toasting position as shown more particularly in Fig. 4 of the drawings, which bread carriers are adapted to move downwardly into toasting position as is shown in Fig. 9 of the drawings, so that a slice of bread positioned on or carried by the bread carrier will be located between the pair of spaced vertically extending heating elements and will be subjected to radiant heat from the resistor conductor when the same is carrying an electric current, all as now well known in the art.

Figure 10:
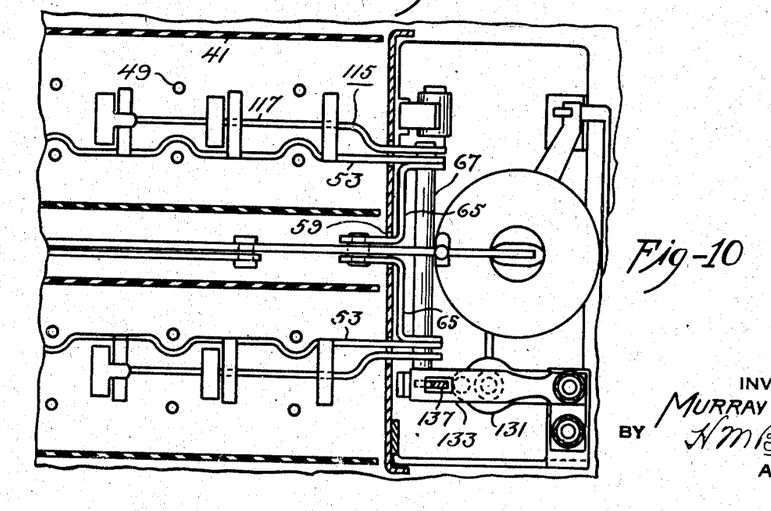
Fig. 10 is a horizontal sectional view taken on the line 10—10 of Fig. 9.

The means for yieldingly biasing the bread carrier upwardly include a linkage structure comprising an upper lever arm 55 which is pivotally mounted in an elongated bracket 57 which may be of generally channel-shape in lateral section and be secured by any suitable means to the rear intermediate wall plate 45. The member 55 is long enough to extend forwardly of the front intermediate wall 47 through a slot 59 therein and it may be noted that the member 55 is not straight but has two parts extending angularly relatively to each other. I provide further a parallel motion means including an upper bar 61 and a lower bar 63 which are positioned below the member 55 and have their rear ends pivotally supported in and by the bracket 57. The front ends of bars 61 and 63 are pivotally connected to two vertically extending plate members 65 which, as shown in Fig. 10 of the drawings, are of generally Z-shape extending away from each other. The front end portions of the members 65 have the front end portions of the bread carriers 53 secured thereto and I may use a horizontal cross bar 67 for the purpose of securing the front end portions of the respective bread carriers 53 rigidly to the members 65 so that downward movement of the front ends of bars 61 and 63 will cause downward movement of the bread carriers 53 which will be retained in substantially horizontal positions, all in a manner now well known in the art. The intermediate portion of lever arm 55 has pivotally connected thereto the upper end of a link 69, the lower end of which is secured to an extension 71 from a part of the rear end portion of bar 63. It is evident that when lever arm 55 is moved from its upper position, shown by the broken lines in Fig. 9 of the drawings, to its lower position, shown by the full lines in Fig. 9, link member 69 will cause a turning movement of the parallel motion structure including more particularly the bars 61 and 63 so that the front ends thereof and particularly the members 65, will be moved downwardly to cause corresponding downward movement of one or several bread carriers connected with member 69, as hereinbefore described. It may be here pointed out that the front end of lever arm 55 is less than that of the members 65.

Means for causing energization of the toast heating elements 39 is mounted on the rear intermediate wall 45 and includes a contact bridging member 73 insulatedly mounted on the lower end of a spring bar 75, the upper end of which is secured to the upper portion of the rear intermediate wall 45, the construction and adjustment of member 75 being such that the contact bridging member 73 thereon will be out of engagement with a pair of fixed contact members 77 insulatedly mounted on and supported by the rear intermediate wall 45 adjacent its lower end. Member 71 has a rearwardly extending portion, shown more specifically in Fig. 9 of the drawings, adapted to engage against the inside surface of bar 75 near to but above its lower end so as to cause outward movement of the lower end away from the rear intermediate wall 45 at the time that the lower bar 63 is moved into the position shown particularly in Fig. 9 of the drawings. It may be here pointed out that Fig. 4 shows the positions of the switch parts when normally open. I may provide a twin conductor cord 79 connected to proper terminals in order to permit of energizing the toast heating elements when the toaster is to be used.

Means for normally yieldingly biasing the bread carriers into their upper, non-toasting position, includes a compression spring 81 which is supported on a small metal platform 83 which may have upwardly extending lugs 85 integral therewith to engage and suitably clamp the lower turn of coil spring 81 and hold it in proper operative position on the platform 83. The upper end of the spring 81 may abut against a top thin metal plate 87 which may have suitable fixed connection with the upper end portion 89 of an armature core member 91 adapted to be magnetized and moved by a coil 93 which is also supported on member 83. It will be noted from Fig. 3 of the drawings that coil 93 is electrically connected in shunt circuit relation with the toast heating elements 39. Member 91 has a lower end portion 95 of reduced dimensions, which portion 95 is integrally connected with the main portion of core 91 by a short part 97 of still smaller diameter than the part 95. Normally when the spring is permitted to expand to its upper limit, as shown for instance in Fig. 6 of the drawings, the portion 89 of the core will be in engagement with the lower edge of the front end of arm 55 and this arm will move upwardly in the slot 59 provided for such purpose and the upper edge of the front end portion of arm 55 will be stopped by the upper end of the slot 59, as shown for instance in Fig. 6 of the drawings.

I may provide a dashpot structure including a cylinder 99 and a piston 101 therein connected with arm 55 by a link 103 so that the movement of the bread carrier will be gradual instead of abrupt, a condition of operation which is necessary because of the sensitivity of the operating structure to be hereinafter described in detail. A bracket 104, of L-shape, secured to the front intermediate wall 47, supports the cylinder 99.

Figure 6:
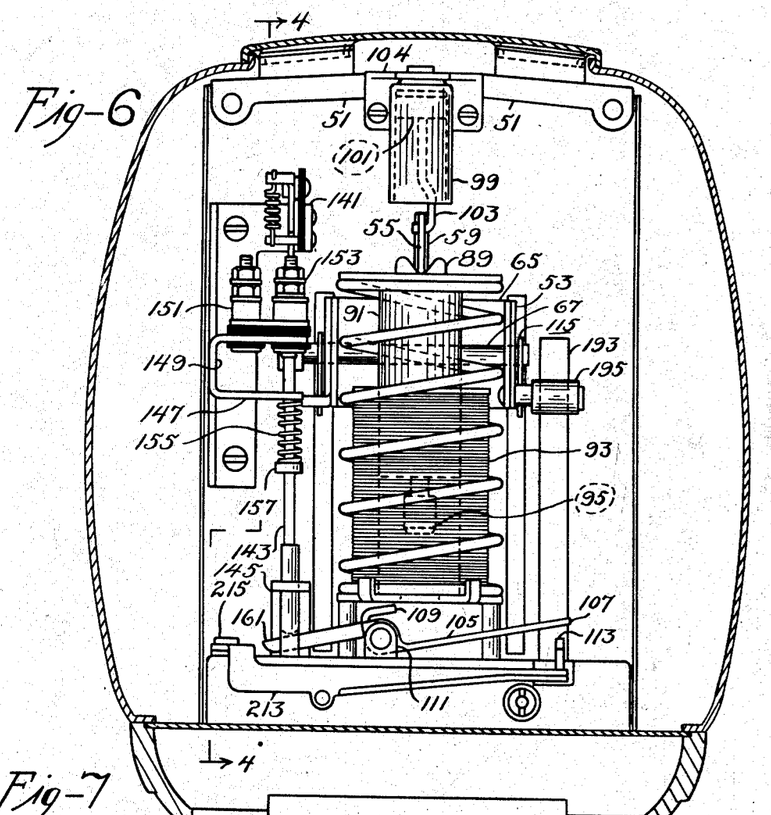
Fig. 6 is a lateral vertical sectional view through the toaster taken on the line 6—6 of Fig. 4 showing parts in front elevation and in non-toasting position.
Figure 7:
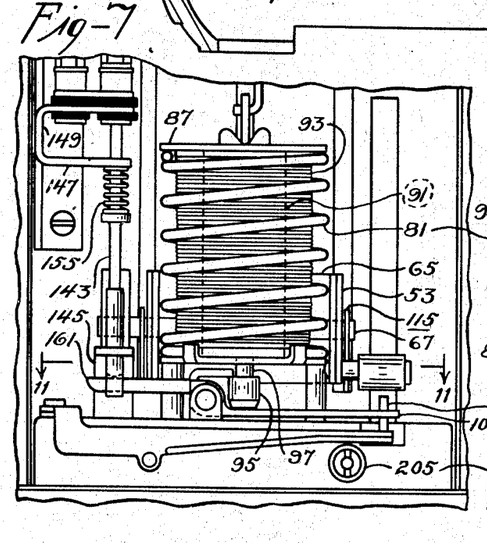
Fig. 7 is a fragmentary view similar to Fig. 6 but showing parts in toasting positions.
Figure 8:
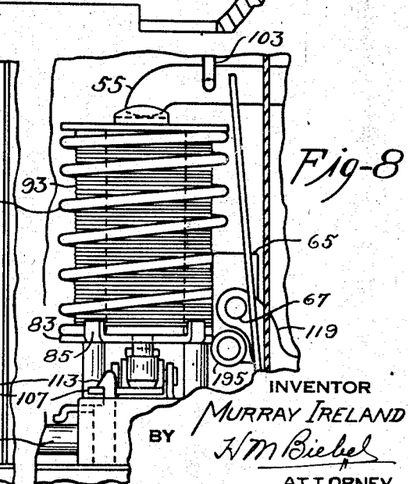
Fig. 8 is a fragmentary side elevational view of the parts shown in Fig. 7.

It is evident that there is no permanent securing of the core member 91 and particularly of its upper end portion 89 to the lever arm 55 and when the coil 93 is energized it will cause downward movement of core member 91 from the position shown in Fig. 6 of the drawings to substantially the position shown in Figs. 7 and 9 of the drawings, with attendant downward movement of the bread carriers 53 because of the fact that the support for lever arm 55 has been suddenly lowered at the start of a toasting operation.

Means for holding the core 91 in its lowered position includes a latch arm 105 shown more particularly in Fig. 6 of the drawings as including a relatively long bar 107 and a short return-bent portion 109, latch 105 being pivotally mounted as on a bracket 111. The normal position of latch member 105 is that shown in Fig. 6 of the drawings so that the portion 95 of the core member may move past the right-hand end of portion 109 and into engagement with the left-hand end of part 107 to cause the latch 105 to turn slightly in a clockwise direction to be moved into holding engagement with a detent 113 which will be described in greater detail hereinafter.

Figure 5:
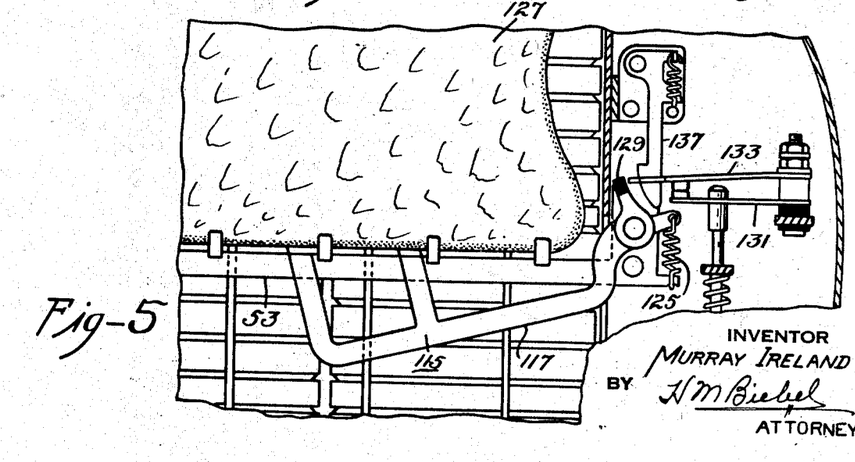
Fig. 5 is a fragmentary view similar to Fig. 4 showing certain parts of the toaster structure when a bread slice has been inserted into the toasting chamber.

Since I desire that the placing of a slice of bread on either one or both of the carriers 53 shall start a toasting operation with attendant downward movement of the carriers into toasting position and energization of the heaters, I provide an auxiliary lever arm 115 which includes a bar 117 normally maintained in substantially horizontal position by reason of the fact that it has a front upwardly extending portion 119 pivotally mounted on the transversely extending pin or bar 67 hereinbefore described. Part 117 has mounted thereon and preferably integral therewith two vertical arms 121 and 123 of different lengths and having top portions extending laterally as to the part 117 thereof, as is shown more particularly in Fig. 10 of the drawings. These upper laterally extending end portions are provided so that a slice of bread, and particularly its lower edge, will be adapted to rest upon these portions initially at the time that a slice of bread is dropped in through the slot 33 or is moved by the operator or user through this bread-receiving slot and into engagement with the upper end of arm 123. The auxiliary lever arm 115 is normally yieldingly biased into the position shown in Fig. 4 of the drawings by a small spring 125 suitably secured to portion 119 and a part of one of the members 65. Fig. 5 of the drawings will show the position occupied by auxiliary lever arm 115 when a slice of bread 127 has been placed in proper operative position on the bread carrier 53 while the latter is still in its upper or non-toasting position.

A switch for controlling the circuit of coil 93 is actuated from its normally open position to its closed position by a small arm 129 constituting a part of portion 119 or suitably rigidly secured thereto so that it will turn with lever arm 115. The switch for coil 93 includes a relatively rigid contact bar 131 and a resilient contact bar 133 normally yieldingly biased into engagement with contact bar 131 but adapted to be held out of engagement therewith by the short arm 129 under certain conditions.

A latch arm 137 has a lower hook-shaped end adapted to fit into an opening in the outer end portion of contact bar 133 so that when a spring 139, which is connected to pivoted arm 137 and to the supporting bracket 141, causes a clockwise bias of latch arm 137, as shown in Figs. 4 and 9 of the drawings, the arm 133 will be held in its upper position by the hook-shaped end of latch arm 137 as shown, for instance, in Fig. 9 of the drawings, during certain times of operation of the toaster. The normal position of contact bar 133 relative to latch arm 137 is that shown in Fig. 4 of the drawings and I will now describe the means for causing upward movement of contact arm 133 from the position shown in Fig. 5 of the drawings to the position shown in Fig. 9 of the drawings.

This means includes a vertically extending rod 143, the lower end portion of which extends through an opening in a bracket 145 secured to suitable means to be hereinafter described and the upper end portion of which extends through an opening in a depending portion 147 in a bracket member 149 provided to carry not only the support 141 for latch arm 137 but also a plurality of terminal members 151 and 153 shown more particularly in Figs. 6 and 7 of the drawings. Terminal member 153 is adapted to support contact arms 131 and 133 so that they may be properly connected in an electric circuit. The extreme upper end portion of arm 143 extends through an opening in arm 131 and may be moved into engagement with contact arm 133 to cause upward movement thereof into the position shown in Fig. 9 of the drawings to cause disengagement of this arm from contact arm 131. The rod 143 is normally maintained in its lowered position by a small coil spring 155, the upper end of which abuts against portion 147 and the lower end of which abuts against a collar 157 secured to an intermediate portion of rod 143. The lower end portion of rod 143 is provided with a slot 159 therein (see Fig. 9) which is adapted to receive an arm 161 rigidly secured to or constituting a part of the latch member 105. It is, therefore, evident that normally the expanded spring 155 on rod 143 will hold or bias the rod 143 downwardly into engagement with member 161 with resultant positioning of the latch 105 in the position shown in Fig. 6 of the drawings where it is ready to be engaged by the descending portion 95 of core 91 as hereinbefore described.

If it be assumed that the toaster has been set up ready for use on a suitable support and that the supply circuit conductor 79 has been properly connected to a source of supply of electric current, the operator will place one or more slices of bread in the toaster through the toast-receiving openings 33 which will cause downward movement of the auxiliary lever arm 115 to the position shown in Fig. 5 of the drawings which shows the parts at the instant when the slice of bread rests upon a bread carrier 53 with the auxiliary lever arm 115 turned in a counter-clockwise direction but before any downward movement of the bread carrier has occurred. It will be noted from an inspection of Fig. 5 of the drawings that arm 129 has been turned out of engagement with the end of contact arm 133 so that arm 133 has moved, by its inherent bias, into circuit-closing engagement with contact arm 131 with resultant energization of coil 93. This will cause quick downward movement of core member 91, engagement of its lower end portion 95 with the latch 105 and turning movement of the latch so that portion 109 will engage over the upper end of portion 95 of the core to hold it in its lower position. It is further obvious that turning movement of latch 105 in a clockwise direction will cause movement of the outer end portion of arm 107 under the hook end of detent member 113. Arm 161 was simultaneously moved upwardly or was turned in a clockwise direction with resultant upward movement of rod 143 to the position shown in Fig. 9 of the drawings where contact arm 133 was moved out of engagement with contact arm 131 and over the lower hook-shaped end of member 137, whereby the coil 93 was deenergized. The contact arm 133 will occupy the position shown in Fig. 9 of the drawings during the toasting operation, held in such position by the rod 143 and after release of the core member 91 and upward movement thereof because of the coil spring 81 at the end of a toasting operation, rod 143 will be permitted to move to the position shown in Fig. 6 of the drawings so that contact arm 133 will then be held by the latch 137 for a limited period of time, all as will be hereinafter described.

It is evident that when upward movement of the bread carrier 53 and of the auxiliary arm 115 thereon has been effected at the end of a toasting operation, the lever arm 115 will occupy the position relative to the bread carrier 53, as shown in Figs. 5 and 9 of the drawings, as long as the slice of bread is permitted to remain on the carrier. However, as soon as the operator removes the slice or slices of bread, spring 125 will cause turning movement of the auxiliary lever 115 which will engage the arcuate surface of the lower hook-shaped end of member 137 to cause turning movement thereof in a counter-clockwise direction from the position shown in Fig. 9 of the drawings to the position shown in Fig. 4 of the drawings so that arm 133 will be disengaged from the latch 137 but will be held in a position to prevent engagement by the arm 131, by reason of the small arm 129, all as shown in Fig. 4 of the drawings. This will, therefore, reset all of the main control portions and parts of the bread carrier structure ready for the next successive operation.

I have shown in Figs. 11 to 17 of the drawings, a thermal timer structure which I may use to determine the duration of a toasting operation but since this is disclosed and claimed in Serial No. 349,932, filed by myself and John R. Gomersall August 2, 1940, and assigned to the same assignee as is the present application, I will describe briefly only the method of operation of this thermal timer since it forms no part of my present invention.

The thermal timer embodies a bimetal bar 171 which has one end thereof secured to a bracket 173 which bracket also has secured thereto one end of a relatively rigid bar 175 which extends normally parallel to but spaced apart from thermal member 171. Bracket 173 is pivotally supported on a pin 177 which pin may be fixedly secured to a small plate 179 of electric insulating material, which is secured to the bottom surface of a small box or casing 181 in which the parts of the thermal timer are positioned.

The box or casing 181 has mounted therein at that end thereof away from the pivot pin 177 a bracket 183 to the lower end portion of which is pivotally connected the detent member 113. Member 113 is of L-shape as shown in Figs. 12, 14 and 16 and a tension coil spring 185 is connected to the horizontally extending portion of detent member 113 to bias it into latching position.

The bimetal bar 171 has a small electric resistor or heating coil 187 insulatedly mounted thereon which heater is adapted to be electrically connected in series circuit relation with the toast heating elements 39.

Figure 12:
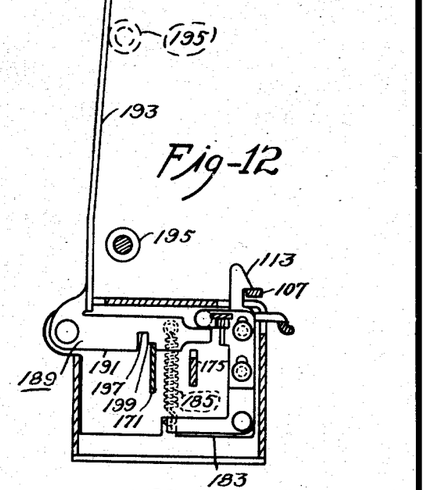
Fig. 12 is a fragmentary vertical section taken on the line 12—12 of Fig. 13, showing certain parts of the thermal timer in latched position occupied during a toasting operation.
Figure 13:
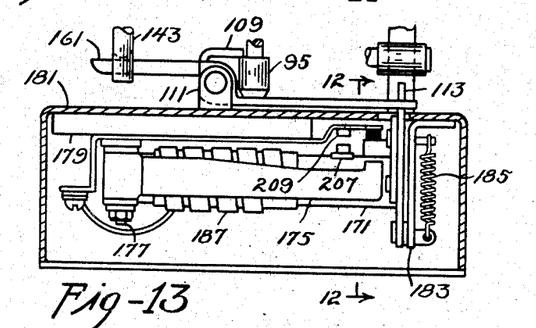
Fig. 13 is a sectional view taken on the line 13—13 of Fig. 11.

A lever arm 189 pivotally mounted on suitable means in the casing 181, which means may be bracket 183, has a lower horizontally extending portion 191 shown, for instance, in Fig. 12 and an upper vertically extending arm 193 which is positioned in front of the front intermediate wall and is bent slightly forwardly as shown in Fig. 12 of the drawings. A roller 195 is mounted on the bread carrier structure hereinbefore described, (see Fig. 6 of the drawings) so that during the time that the toaster is not in use and when the bread carriers are in their upper position, arm 189 will be in the position shown in Fig. 12 of the drawings. Arm portion 191 is provided with a recess 197 in its lower edge which has a shoulder portion 199 in which the movable or free end portion of bimetal bar 171 is adapted normally to rest.

Figures 14, 16:
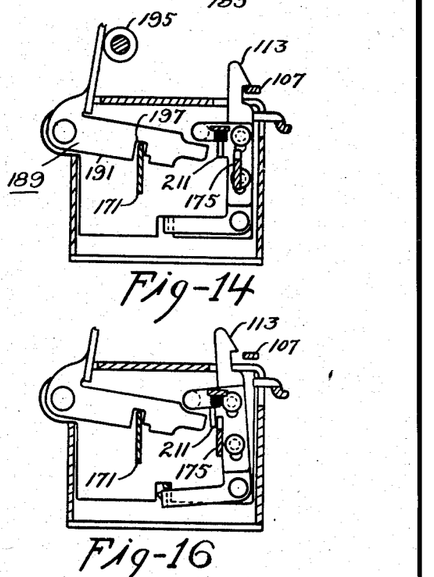
Fig. 14 is a fragmentary sectional view similar to Fig. 12 except showing the parts thereof in different operative positions as occupied by them at a certain time during a toasting operation.
Fig. 16 is a fragmentary sectional view similar to Fig. 12, the parts being shown in unlatched position occupied by them at the end of a toasting operation, and, Fig. 17 is a fragmentary view similar to Fig. 13 but showing the parts in the positions they will occupy when the thermal timer element is heated.
Figure 15:
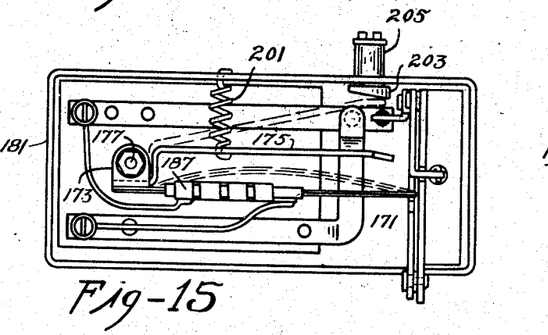
Fig. 15 is a bottom view of the thermal timing means with the parts shown in non-toasting and cool position in the full lines and shown in their heated positions by broken lines.
Figure 17:
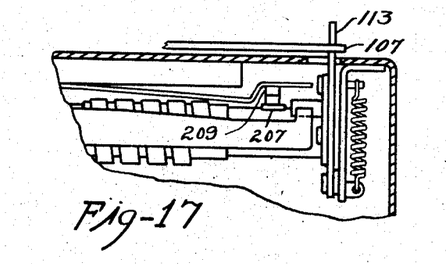

When current flows through the heating coil 187 the bimetal bar normally tends to move to the right as seen in Figs. 12, 14 and 16 but is prevented from doing so by reason of its fitting into the shoulder portion 199. However, the bimetal bar 171 will flex into the position shown by the broken lines in Fig. 15 of the drawings with attendant turning movement of rigid arm 175 in a counter-clockwise direction, as seen in Fig. 15, a small coil spring 201 connected to arm 175 ensuring this turning movement. At a certain temperature of the bimetal bar 171 member 175 will engage a point on a cam surface 203 of a manually adjustable means 205, these parts being those provided to vary the duration of a toasting operation. When the end portion of member 175 engages cam surface 203, the bimetal member 171 will be caused to move out of the shoulder 199 into the position shown in Fig. 14 of the drawings where it will move into the deeper part of recess 197 permitting angular turning movement of lever arm 189 into the position shown particularly in Fig. 14 of the drawings.

The energization of auxiliary heater 187 is controlled by a pair of contact members 207 and 209 which are normally held out of engagement but permitted to engage when arm 191 moves into the position shown in Fig. 14 of the drawings so that thereby auxiliary heater 187 is de-energized and the bimetal bar 171 will then begin to cool. Fig. 14 shows the position occupied by the rigid bar 175 immediately after the de-energization of auxiliary heater 187 and before effective cooling of the bimetal bar 171 has occurred while Fig. 16 shows that the bimetal bar 171, the free end of which is now held in a relatively fixed position, has cooled enough to cause bar 175 to engage an ear 211 constituting a part of the detent lever arm 113. Further cooling of the bimetal bar 171 will cause further movement of bar 175 in a left-hand direction, as seen in Figs. 14 and 16, with final turning movement of detent 113 into the position shown in Fig. 16 where latch arm 107 has been released and upward movement of the armature core and of the carriers and of all of the parts connected therewith may occur. The upward movement of roller 195 will cause turning movement of member 189 in a counter-clockwise direction to restore all of the parts to their normal positions ready for the next successive toasting operation.

Figure 11:
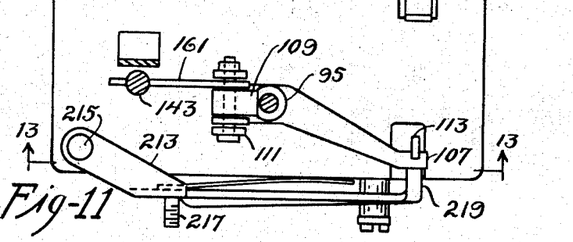
Fig. 11 is a fragmentary top plan view showing more particularly the thermostatic timing means and taken on the line 11—11 of Fig. 7.

As it may be dsirable at times to cause early termination of a toasting operation, even before the proper toasting desired has taken place, I provide a lever arm 213 pivotally mounted on a pin 215 and having a short forwardly extending member 217 projecting outwardly through the front wall of the toaster for manual operation by the user, if and when desired. The right-hand end of pivoted arm 213 has a rearwardly extending portion 219 adapted to engage against the front edge of detent 113 so that pressure on member 217 will cause turning movement of arm 213 in a counter-clockwise direction as seen in Fig. 11 of the drawings, with resultant turning movement of detent arm 113 out of engagement with latch 107 and immediate termination of the toasting operation.

I desire to point out that reference may be had to copending application Serial No. 349,932 or its resulting patent for further details of the construction and operation of the thermal timer.

While I have illustrated and described a specific form of timer and particularly a thermal timer, I do not desire to be limited thereto and I may use any kind of timer now available or which may hereinafter be available and which is effective for substantially the same purpose.

It is, therefore, evident the toaster particularly embodying my invention provides electromagnetically actuated spring means effective to normally hold a bread carrier in non-toasting position, that I provide relatively simple means mounted particularly on a vertically reciprocally movable bread carrier and initially holding an electromagnetic circuit controlling switch in open position, as well as simple means actuated by the placing of a slice of bread on the bread carrier, to cause closure of the coil circuit-controlling switch, energization of the coil, downward movement of its core with attendant compression of a bread carrier biasing spring and movement of a support unsecured to the bread carrier out of engagement therewith with attendant downward movement of the carrier into toasting position and immediate starting of a toasting operation.

While I have described and illustrated specific embodiments of my invention I do not desire to be limited thereto since all modifications coming clearly within the spirit and scope of the appended claims are to be considered as being covered thereby.

I claim as my invention:

1. An automatic electric toaster including toast heating elements and supporting means for the said toast heating elements, a bread carrier movable into toasting and non-toasting positions relatively to the toast heating elements and normally yieldingly biased into non-toasting position, an electromagnet operative to remove the bias on said bread carrier and cause it to move into toasting position, a normally open switch controlling the energization of said electromagnet and fixedly mounted on the said supporting means for the said toast heating elements, a lever arm pivotally mounted on and movable with said bread carrier to toasting position, said lever arm having a part thereof normally positioned above said carrier and adapted to be depressed by a piece of bread placed on the carrier, means actuated by the lever arm with the carrier in non-toasting position to cause closing of the electromagnet-control switch, energization of the electromagnet, downward movement of its core with removal of the bias normally acting on said carrier with the lever arm and movement of the bread carrier into toasting position, and means operative when the carrier is in toasting position to cause opening of the said electromagnet control switch.

2. An automatic electric toaster including toast heating elements, a bread carrier movable into toasting and non-toasting positions relatively to the toast heating elements and normally yieldingly biased into non-toasting position, an electromagnet having a movable core adapted when energized to remove the bias on said bread carrier and cause it to move into toasting position, a switch controlling the energization of the electromagnet and yieldingly biased into closed position, a lever arm pivotally mounted on the carrier and adapted to engage said switch and hold it in open position when the carrier is in its non-toasting position, spring means adapted to normally yieldingly bias the lever into switch-opening position, the placing of a slice of bread in operative position on the carrier causing turning movement of the lever, disengagement thereof from the switch, energization of the electromagnet, downward movement of the core and of the carrier into toasting position, and means operative when the carrier is in toasting position to cause opening of the said electromagnet control switch.

3. An automatic electric toaster including toast heating elements, a bread carrier movable into toasting and non-toasting positions relatively to the toast heating elements and normally yieldingly biased into non-toasting position, an electromagnet having a movable core adapted when energized to remove the bias on said bread carrier and cause it to move into toasting position, a switch controlling the energization of the electromagnet, a lever arm pivotally mounted on the carrier and adapted to engage said switch and hold it in open position when the carrier is in its non-toasting position, spring means adapted to normally yieldingly bias the lever into switch-opening position, the placing of a slice of bread in operative position on the carrier causing turning movement of the lever, closing of the switch, energization of the electromagnet, downward movement of the core and of the carrier into toasting position, means operative when the carrier is in toasting position to cause opening of said electromagnet control switch, means controlling the return of the said carrier to non-toasting position, and a latch engageable by said switch to hold it in open position, said latch being engageable by said lever arm after return of the carrier to non-toasting position when a slice of bread is removed therefrom to cause it to be released from said switch, the lever arm then becoming operative to hold said switch in open position.

4. An automatic electric toaster including toast heating elements, a bread carrier movable into toasting and non-toasting positions relatively to the toast heating elements and normally yieldingly biased into non-toasting position, an electromagnet operative to remove the bias on said bread carrier and cause it to move into toasting position, a normally open switch controlling the energization of said electromagnet mounted in the said toaster and the said bread carrier relatively movable to the said switch, a lever arm pivotally mounted on said bread carrier and having a part thereof normally positioned above said carrier and adapted to be depressed by a piece of bread placed on the carrier, means actuated by the lever arm when the carrier is in non-toasting position to cause closing of the electromagnet-control switch, energization of the electromagnet, downward movement of its core with removal of the bias normally acting on said carrier and movement of the bread carrier into toasting position, means actuated by said electromagnet to cause opening of said electromagnet-control switch, a detent for holding the core in its lowered position and a timing means to effect release of the core member and return of the bread carrier into non-toasting position at the end of a toasting operation and locking means adapted to hold the said electromagnet control switch in an open position upon return of the said bread carrier into non-toasting position until the removal of the said piece of bread and upon removal of the said piece of bread, the lever arm aforesaid so arranged as to disengage the said locking means whereon the said lever arm is adapted to hold the said switch in open position until the said lever arm is again depressed by a piece of bread placed on the said carrier.

5. An automatic electric toaster including toast heating elements, a bread carrier movable into toasting and non-toasting positions relatively to the toast heating elements and normally yieldingly biased into non-toasting position, an electromagnet having a movable core adapted when energized to remove the bias on said bread carrier and cause it to move into toasting position, a switch controlling the energization of the electromagnet yieldingly biased to closed position, a lever arm pivotally mounted on the carrier and adapted to engage said switch and hold it in open position when the carrier is in its non-toasting position, spring means adapted to normally yieldingly bias the lever into switch-opening position, the placing of a slice of bread in operative position on the carrier causing turning movement of the lever, disengagement thereof from the switch, energization of the electromagnet, downward movement of the core and of the carrier into toasting position, means engaged by the core in its downward movement and moved thereby into core-holding position, means actuated by said core-holding means to cause opening of said switch, locking means to hold the said switch in open position and a timing means to effect release of the core-holding means and return of the bread carrier into non-toasting position, removal of a slice of bread from the carrier causing return of the lever into position in such a manner as to release the said locking means and the said lever adapted to hold open the electromagnet-control switch until the said lever is again actuated by the placing of a piece of bread in operative position on the said carrier.

6. In an automatic electric toaster, heating means, a bread carrier movable into toasting and non-toasting positions relative to the heating means, electromagnetic motor means for moving the carrier from non-toasting to toasting position, means for returning the carrier from toasting to non-toasting position, a control switch for energizing the electromagnetic motor means mounted in the toaster, a switch closing member mounted on the carrier in position to actuate said control switch when the carrier is in non-toasting position, said switch closing member being engageable by a bread slice upon application to the carrier to cause closing of the switch and being movable out of switch actuating position when the carrier is moved into toasting position, and means operative when the carrier is moved into toasting position for opening the control switch.

7. In an automatic electric toaster, heating means, a bread carrier movable into toasting and non-toasting positions relative to the heating means, electromagnetic motor means for moving the carrier from non-toasting to toasting position, means for returning the carrier from toasting to non-toasting position, a control switch for energizing the electromagnetic motor means yieldingly biased to closed position, a releasable element for holding the switch open when the carrier is in non-toasting position, means actuatable by a bread slice upon application thereof to the carrier to release said holding element and cause closing of said switch, and means operative when the carrier is in toasting position to open said switch.

8. In an automatic electric toaster, heating means, a bread carrier movable into toasting and non-toasting positions relative to the heating means, electromagnetic motor means for moving the carrier from non-toasting to toasting position, means for returning the carrier from toasting to non-toasting position, a control switch for energizing the electromagnetic motor means yieldingly biased to closed position, means mounted on the carrier for holding the switch open when the carrier is in non-toasting position and being actuatable by a bread slice upon application to the carrier to cause closing of the switch, and means rendered operative in response to movement of the carrier into toasting position for opening and retaining open the control switch independently of said slice actuated means.

9. In an automatic electric toaster, heating means, supporting means for the said heating means, a bread carrier movable into toasting and non-toasting positions relative to the heating means, electromagnetic motor means for moving the carrier from non-toasting to toasting position, means for returning the carrier from toasting to non-toasting position, a control switch for energizing the electromagnetic motor means yieldingly biased to closed position and fixedly mounted on the said supporting means, lever means mounted on the carrier for holding the switch open when the carrier is in non-toasting position and being actuatable by a bread slice upon application to the carrier to cause closing of the switch, latch means for securing the switch in open position, means responsive to movement of the carrier to toasting position for moving the switch into open locking engagement with said latch means, and means responsive to removal of a toasted bread slice from the carrier after return to non-toasting position for releasing said latch means whereupon the said lever means mounted on the said carrier is adapted to hold the said switch open, until the said lever means is actuated by a bread slice upon application to the said carrier.

10. In an automatic electric toaster, heating means, a bread carrier movable into toasting and non-toasting positions relative to the heating means, electromagnetic motor means for moving the carrier from non-toasting to toasting position, means for returning the carrier from toasting to non-toasting position, a switch for energizing the electromagnetic motor means mounted in the toaster and the said bread carrier relatively movable to the said switch, control means actuatable by a bread slice upon application to the carrier for causing closing of said switch when the carrier is in non-toasting position, independent means for reopening the switch operative when the carrier has moved to toasting position, latch means for securing the switch in open position when the carrier returns to non-toasting position, and means responsive to withdrawal of a toasted bread slice from the carrier for releasing said switch latch means whereupon the said control means is adapted to retain the said switch in open position in such a manner that the said switch may be closed upon actuation of the said control means by the application of a bread slice to the said carrier.

11. In an automatic toaster of the type comprising heating means, a bread carrier movable into toasting and non-toasting positions relative to the heating means, electromagnetic motor means for moving the carrier from non-toasting to toasting position, means for returning the carrier from toasting to non-toasting position, a switch for energizing the electromagnetic motor means and manually operable means for causing the closing of the said switch; the improvement comprising means for reopening the said switch operative upon movement of the said carrier into toasting position, a latch means for securing the said switch in the said open position and manually operable means for releasing the said latch means, the said latch releasing means manually operable upon return of the said carrier to non-toasting position for closing the said switch for returning the said carrrier to toasting position.

12. In an automatic toaster of the type comprising heating means, a bread carrier movable into toasting and non-toasting positions relative to the heating means, electromagnetic motor means for moving the carrier from non-toasting to toasting position, means for returning the carrier from toasting to non-toasting position, a switch for energizing the electromagnetic motor means and manually operable means for causing the closing of the said switch; the improvement comprising means operative when the said carrier is in toasting position to cause opening of the said switch, spring latch means for locking the said switch in the said open position and operable means for releasing the said latch means.

13. In an automatic toaster of the type comprising heating means, a bread carrier movable into toasting and non-toasting positions relative to the heating means, electromagnetic motor means for moving the carrier from non-toasting to toasting position, a switch for energizing the electromagnetic motor means and manually operable control means for causing the closing of the said switch; the improvement comprising means adapted to actuate the said switch means in such a manner as to open the said switch upon movement of the said bread carrier into the said bread toasting position, and latch means for locking the said switch in the said open position.

14. In an automatic toaster of the class including a casing having a toasting chamber, a bread carrier in said chamber movable from a bread receiving position to a bread toasting position in said toasting chamber, an electrically operated means adapted to move the said bread carrier from the said bread receiving position to the bread toasting position, and means adapted to return the said bread carrier from the bread toasting to the said bread receiving position; the improvement comprising control means for making the circuit of the said electrically operated means, the said control means adapted to be actuated by a slice of bread in such a manner as to make the circuit aforesaid upon the positioning of the said slice of bread upon the said bread carrier, and means adapted to actuate the said control means in such a manner as to open the said circuit upon movement of the said bread carrier into the bread toasting position, and spring latch means adapted to lock the said control means in the said open position, and means operating at the termination of the toasting operation for returning the said bread carrier to the aforesaid bread receiving position, the said spring and latch means adapted to retain the said control means in the said locked open position upon the return of the said bread carrier to the aforesaid receiving position, and manually operable means for releasing the said spring latch means.

MURRAY IRELAND.